COMMUNICATION SYSTEM FOR THE SELECTIVE TRANSMISSION
OF SPEECH AND DATA
Filed June 3, 1963
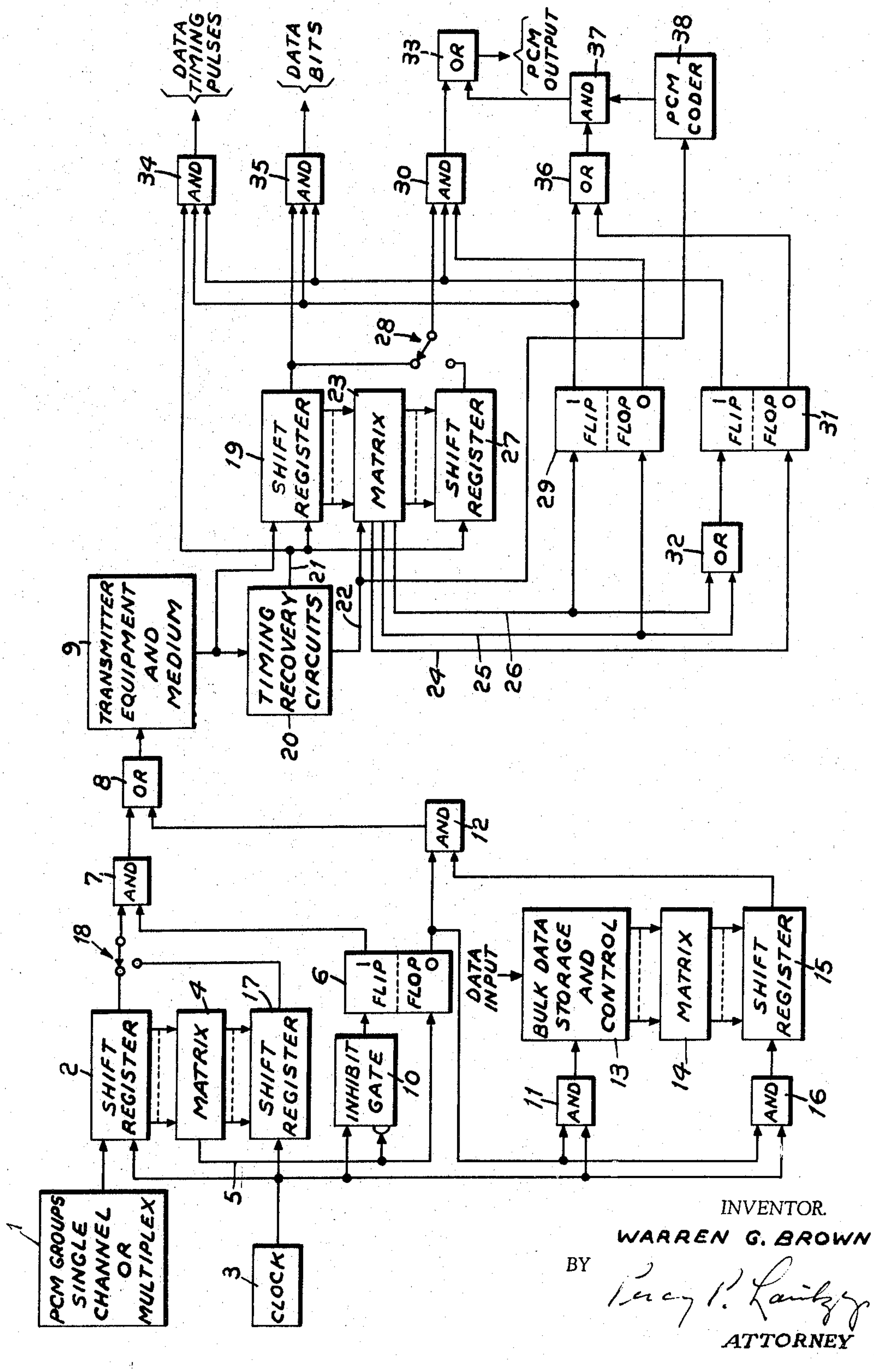
INVENTOR.
WARREN G. BROWN
BY
Percy P. Lantzy
ATTORNEY United States Patent Office 3,310,631 Patented Mar. 21, 1967

3,310,631

COMMUNICATION SYSTEM FOR THE SELECTIVE TRANSMISSION OF SPEECH AND DATA

Warren G. Brown, River Vale, N.J., assignor to International Telephone and Telegraph Corporation, Nutley, N.J., a corporation of Maryland Filed June 3, 1963, Ser. No. 285,011
19 Claims. (Cl. 179—15)

This invention relates to communication systems and more particularly to a communication system wherein lulls in a first transmitted intelligence signal are utilized for the transmission of a second type of intelligence signal.

It is known that when PCM (pulse code modulation) is used to convey speech on voice channels that there is available a capacity of approximately 50,000 bits per second. It is also known that these voice channels are idle for more than half the time during two-way conversations. This idle time can be utilized to provide approximately 30,000 bits of data information which can be interleaved into the conversation with no significant effect on the voice channel. The outstanding advantage of this mode of operation is that the data information is not real time, that is, it does not occupy a particular time slot in the transmission channel. Because of this, a relatively small group and even one single PCM voice channel can be shared.

In the past, the time sharing of speech and data in a voice channel has depended upon having statistically large numbers of voice channels so that the probability of all talkers being active can be ignored. This assumption becomes more risky as the number of multiplex channels is decreased. Also, in this prior art arrangement there is required complex scanning equipment to search all of the channels in a sequential manner for a vacant channel and then apply the data information to this vacant channel.

This arrangement of a non-real time communication system for the sharing of a voice channel between speech and data information does not have the risk that all of the channels will be busy or even that a single channel will be so active that the alternate traffic cannot be handled. This non-real time arrangement provides a tremendous potential for transmission capacity, perhaps 50,000 words per minute, along with each voice channel.

One type of non-real time voice channel sharing is known wherein gaps in the speech are detected, a special code is sent when the gap is detected so that the receiving equipment can prepare to accept data characters, send data characters while monitoring the start of a new speech sound, send a message interrupt code when speech resumes, and return the channels to speech service. While this has an advantage over the real time system, as described hereinabove, it is required that each voice channel have associated therewith a transmitting transfer equipment and receiving transfer equipment for each channel in a multichannel communication system.

An object of this invention is to provide an improvement over the above-mentioned non-real time sharing of a voice channel wherein the same transfer equipment can be employed with a single channel system or a time division system.

A feature of this invention is the provision of a communication system comprising a source of code groups representing the amplitude of one source or a plurality of source of a first type of intelligence, such as speech, a source of code characters representing a second type of intelligence, such as teletype and the like data, first means coupled to the source of code groups to detect at least one code group representing a given amplitude, for instance, zero amplitude of the intelligence of the one source or plurality of sources of intelligence of the first type, second means coupled to the source of code characters, the source of code groups and the first means to substitute the code characters for each of the one code group when detected, third means coupled to the second means for transmission of the resultant integrated pulse train, and fourth means coupled to the third means responsive to the bits of both the code groups and the code characters for separation thereof from the integrated pulse train.

Another feature of this invention is the employment of redundant coding so that the first type of intelligence will have a first constant ratio of "marks" to "spaces" and the second type of intelligence will have a second constant ratio of "marks" to "spaces" different than the first constant ratio to enable the separation of the two types of coded intelligence at the receiver from the integrated pulse train for application to their respective outputs and also to indicate the presence of errors in the code groups or code characters being received.

Still another feature of this invention is that all of the available code group time positions present in a time division multiplex PCM pulse train are combined into a single high speed data channel with one transmitting transfer equipment and one receiving transfer equipment.

The above-mentioned and other features and objects of this invention will become more apparent by reference to the following description taken in conjunction with the accompanying drawings, in which the single figure is a schematic diagram in block form of a communication system in accordance with the principles of this invention.

The system of this invention relies upon the use of redundant coding so that there is a code distance of at least one between any allowable code character representing data and any allowable code group representing the amplitude of speech. All data code characters will be assigned to one code group representing a given amplitude of the speech, for instance, the neutral or zero amplitude code group. All PCM code groups will be assigned as blanks or gaps in the data message. As an example, let us assume that 70–4:8 constant ratio codes are assigned to represent the amplitude levels achieved by the speech, 28–2:8 constant ratio codes represent lower case teleprinter characters, and 28–6:8 constant ratio codes represent the upper case teleprinter characters. Received groups of eight bits with 0, 1, 3, 5, 7, or 8 marks would be detected as errors, received groups of 2 or 6 marks would appear as data code characters and as level 35 or 36 in the PCM output pulse stream. Received groups of 4 marks would appear as data blanks (interruptions) and as PCM code groups. This is equivalent to saying that 56 other code characters (2:8 and 6:8 combinations) all are assigned as level 35 or 36 in the PCM pulse train. This is the most probable level in speech, statistically, and every time a speech wave zero crossing is sampled, a data code character can be inserted in place of that sample. This could permit several thousand characters a second to be inserted in an uninterrupted sound pattern with no response time problems and absolutely no distortion of the PCM output other than the normal quantizing noise.

This principle upon which the circuit in the drawing is based has the following interesting features:

(a) All single errors are detected (along with any odd number of errors) regardless of which transmission is under way (speech or data).

(b) No time delay or special transfer control characters are needed because the codes employed with this system are self-sorting.

(c) The bit rate is only 14.3% higher than for a 64 level PCM code with a parity bit, 33% higher than with no parity bit.

(d) A multiplex PCM pulse train can be handled as a whole for data transmission because there is no dependence on the statistics of the speech source which would differ greatly between single talkers and multiplex coder outputs.

Referring to the figure, there is illustrated therein an example of a communication system following the principles of this invention. The PCM code groups, either single channel or a plurality of multiplex channels on a time basis, are coupled from source 1 to a shift register 2 which is under control of clock 3. Matrix 4 is coupled to the stages of shift register 2 and arranged to detect the code group pattern of the idle or unmodulated level, in other words, the zero amplitude level of the speech signal. Matrix 4 recognizes this specific code pattern when stored in register 2 and applies an output over conductor 5 when this unmodulated code pattern is recognized. Up to the time of recognition of this given code group flip-flop 6 has a high output from its "1" output which enables AND gate 7 for the passage of the code group stored in register 2 to an OR gate 8 and, hence to transmission equipment and medium 9.

When the unmodulated or zero code group is recognized by matrix 4 an output appears on conductor 5. Inhibit gate 10 is inhibited preventing the resetting of flip-flop 6 and enables the setting of flip-flop 6 to provide a low output at the "1" output to block AND gate 7 and a high output at the "0" output to enable AND gates 11 and 12. With AND gate 11 enabled during the occurrence of a clock pulse from source 3, a data character is transferred from the storage and control equipment 13 through a matrix 14 which operates to translate the data code characters into code groups which do not occur in the permissible code groups of the coded speech. The data could, of course, be stored in equipment 13 in the translated code groups, that is, code groups that correspond to permissible speech code groups prior to being coupled to the input of the storage equipment 13. This would enable the elimination of matrix 14.

The output from storage 13 or matrix 14 is coupled to a shift register 15 which under control of the redundant AND gate 16 passes the data characters through AND gate 12 to OR gate 8 and, hence, to transmission equipment and medium 9.

Thus, for the operation described immediately above, the data character is sent to transmission equipment and medium 9 in place of the neutral or zero level code group. The output of source 1 could be in the redundant code configuration as set forth in the example hereinabove, and the system would operate as described above. However, if the code groups of source 1 are of the weighted binary PCM type, the system can handle such an arrangement by a slight modification of the equipment described hereinabove. By modifying matrix 4 the weighted binary code groups can be translated into the constant ratio type code which is arbitrarily chosen for the operation of this system. The output of matrix 4 would be coupled to shift register 17 and through switch 18 when it is in its other position. With this modification the transmitting equipment of the communication system of this invention will operate as described above.

The integrated pulse train including the code groups representing the amplitudes of either a single speech source or a multiplex plurality of voice sources and the code characters of the data, such as a teleprinter, is coupled from medium 9 to a shift register 19 and to circuit 20. Shift register 19 stores the received integrated pulse train and circuit 20 recovers the timing information necessary to synchronize the receiver operation of the transmitter. The output of circuit 20 provides pulses at the output 21 having a rate equal to the rate of the bits in the received pulse train and pulses at output 22 having a rate equal to the rate of the character or code group.

Matrix 23 checks each character or code group stored in register 19 and provides three outputs, one an error signal output on lead 24 when the character stored in register 19 is not one of the allowable data character or code groups mentioned hereinabove, an output on lead 25 when a code group is received, and an output on lead 26 when a data code character is received.

Shift register 27 is employed and will be placed in operation if the shift register 17 in the transmitting equipment was utilized. Register 27 translates the code groups back to the weighted binary form from the constant ratio equivalent. Register 27 is placed in operation by moving switch 28 to its other position.

The operation of the receiver is as follows. When matrix 23 detects a code group, the output on conductor 25 causes flip-flop 29 to provide a high output at its "0" output to enable AND gate 30. Flip-flop 31 through OR gate 32 will provide a high output on its "1" output to provide the second enabling pulse to AND gate 30 permitting the passage of the signal in register 19 through switch 28 in the position illustrated through AND gate 30 and, hence, through OR gate 33 to the PCM output.

When a data character is recognized or detected by matrix 23, flip-flop 29 is activated over conductor 26 to provide a high output from its "1" output enabling AND gates 34 and 35. Flip-flop 31 through OR gate 32 will provide a high output from its "1" output which will provide the second enabling pulse for both AND gates 34 and 35. This will permit the generation of data timing pulses at the output of AND gate 34 as derived from output 21 of circuit 20 and will provide the data bits at the output of AND gate 35 from shift register 19. The "1" output of flip-flop 29 is also coupled to the OR gate 36 which will enable AND gate 37 to pass the output of coder 38 to the OR gate 33 and, hence, to the PCM output. Coder 38 is to provide the code group or pattern representing the neutral code level. Thus, when data bits are being separated from the integrated pulse train, and data timing pulses are being derived from circuit 20, the PCM output has coupled thereto the zero level code pattern. The data timing pulses are utilized to control the storage facilities for the data. The storage facilities will operate only when both data code characters and data timing pulses are present, thereby preventing the storage medium from storing data interruptions, that is, the time when the speech code groups are being received.

When matrix 23 detects an error in the code group or code character in register 19, the error signal on conductor 24 triggers flip-flop 31 to provide a high signal from the "0" output and a low signal from the "1" output. The signal from the "1" output acts to disable AND gates 30, 34, and 35, thereby preventing the passage of any information stored in register 19 and the data timing pulses derived from circuit 20. The high signal at the "0" output is passed through OR gate 36 enabling AND gate 37 and applying the zero amplitude or neutral code group or pattern through OR gate 33 to the PCM output.

The system described hereinabove has the advantage of reduction in transmission transfer and receiving transfer equipment when compared to the non-real time prior art mentioned hereinabove. However, the achievement of reduction of equipment has introduced problems within itself and will tend to limit the use of this system to top quality transmission communication equipment since the system is vulnerable to errors. For one, the system, as described, cannot differentiate between an error occurring in a data code character or a PCM code group. This can be overcome, however, by employing an extra bit associated with each code group and each data code character to indicate to which class of service the group belongs. The codes used in the example above, four out of eight marks for a PCM code group, two out of eight marks or six out of eight marks for data characters have a code distance of 2 so that all single errors can be detected. However, no combination of errors which maintains 2, 4, or 6 marks in a code group or character or changes from 2, 4, or 6 marks to another value among 2, 4, or 6 marks can be detected. A combination of errors which does not change the mark ratio will produce an undetected error in the output for which the character was intended. A change from 4 to 2 or 6 marks will insert a spurious character into the data channel and cause a click in one PCM channel. A change from 2 or 6 to 4 marks will cause a character to be omitted from the message without a clue and put a click into one PCM channel. All odd numbers of characters, however, are capable of being detected in this system. Two, four or six errors can only be detected if the result is no marks or eight marks in a group. Eight errors will never produce a detected error and is very unlikely to occur since four errors is the most likely number even in the complete absence of a received signal.

The most disturbing problem in the error detection capabilities is the change in the character code group count. This can be checked by sending known block lengths. Even the correct character count in the block is not an absolute check since lost characters may cancel spurious characters. It should be noted, however, that this is a universal characteristic of self-checking codes. The most likely forms of errors can be detected but there is always a possibility that errors can convert one valid sequence of bits to another valid but incorrect sequence of bits.

The simplest possible code to use with this system would require that one extra bit be associated with each PCM code group or data code character to indicate which class of traffic the group belongs in.

In the operation of the system above described the data characters and the PCM code groups should each either include either the same number of bits or be shimmed to to the same length unless the data characters are taken as an arbitrary series of bits cut to match the PCM code group lengths.

In the operation of this system the coders forming the speech code groups should have idle stability so that a known idle or zero level code group or pattern will occur in the absence of modulation. A feedback bias control, such as described in my copending application, Ser. No. 201,080, filed June 8, 1962, entitled, "Pulse Code Modulation Coder," now Patent No. 3,201,777, or a solid state coder having an inherent stability to hold a known level can be employed. If this predetermined idle pattern is not maintained, the data capacity will be substantially wiped out.

While I have described above the principles of my invention in connection with specific apparatus, it is to be clearly understood that this description is made only by way of example and not as a limitation to the scope of my invention as set forth in the objects thereof and in the accompanying claims.

I claim:

1. A communication system comprising:
- a source of code groups representing the amplitude of at least one source of a first type of intelligence;
- a source of code characters representing a second type of intelligence;
- first means coupled to said source of code groups to detect at least one code group representing a given amplitude of the intelligence of said one source;
- second means coupled to said source of code characters, said source of code groups and said first means to substitute said code characters for said one code group when detected;
- third means coupled to said second means for transmission of the resultant integrated pulse train; and
- fourth means coupled to said third means for separation of said code groups and said code characters from said integrated pulse train;
- said fourth means including:
  - fifth means to detect the condition of all the bits of both said code groups and said code characters to control said separation.

2. A system according to claim 1, wherein
- said first type of intelligence is speech; and
- said second type of intelligence is data.

3. A system according to claim 1, wherein said one code group represents the zero amplitude of the intelligence of said one source.

4. A communication system comprising:
- a source of code groups representing the amplitude of at least one source of a first type of intelligence;
- a source of code characters representing a second type of intelligence;
- first means coupled to said source of code groups to detect at least one code group representing a given amplitude of the intelligence of said one source;
- second means coupled to said source of code characters, said source of code groups and said first means to substitute said code characters for said one code group when detected;
- third means coupled to said second means for transmission of the resultant integrated pulse train; and
- fourth means coupled to said third means responsive to the bits of both said code groups and said code characters for separation thereof from said integrated pulse train;
- said code groups each include
  - a first constant ratio of "marks" to "spaces" and
- said code characters include
  - at least a second constant ratio of "marks" to "spaces" different than said first ratio.

5. A system according to claim 4, wherein said fourth means includes
- fifth means to detect said first and second ratios to control the separation of said code groups and said code characters from said integrated pulse train.

6. A system according to claim 5, wherein said fourth means further includes
- a sixth means coupled to said fifth means responsive to the output therefrom to pass said code groups to its output when said first ratio is detected, to pass said code characters to its output when said second ratio is detected, and to prevent the passage of said code groups and said code characters when neither of said first and second ratios are detected.

7. A system according to claim 6, wherein said fourth means further includes
- a seventh means coupled to said sixth means to provide the code group representing zero amplitude for the code group output when said second ratio is detected and when neither of said first and second ratios are detected.

8. A system according to claim 4, wherein
- said first type of intelligence is speech; and
- said second type of intelligence is data.

9. A system according to claim 4, wherein said one code group represents the zero amplitude of the intelligence of said one source.

10. A communication system comprising:
- a source of code groups representing the amplitude of at least one source of a first type of intelligence;
- a source of code characters representing a second type of intelligence;
- first means coupled to said source of code groups to detect at least one code group representing a given amplitude of the intelligence of said one source;
- second means coupled to said source of code characters, said source of code groups and said first means to substitute said code characters for said one code group when detected;
- third means coupled to said second means for transmission of the resultant integrated pulse train; and
- fourth means coupled to said third means responsive to all the bits of both said code groups and said code characters for separation thereof from said integrated pulse train;

said fourth means including a means coupled to said third means responsive to all the bits of both said code groups and said code characters of said integrated pulse train to detect errors in said integrated pulse train and stop said separation when said errors are detected.

11. A communication system comprising:

a source of time division multiplex code groups representing the amplitude of a plurality of sources of a first type of intelligence;

first means coupled to said source of code groups to detect at least one code group representing a given amplitude of the intelligence of said plurality of sources;

second means coupled to said source of code characters, said source of code groups, and said first means to substitute said code characters for said one code group when detected;

third means coupled to said second means for transmission of the resultant integrated pulse train; and fourth means coupled to said third means responsive to the bits of both said code groups and said code characters for separation thereof from said integrated pulse train;

said code groups each include a first constant ratio of "marks" to "spaces"; and said code characters include at least a second constant ratio of "marks" to "spaces" different than said first ratio.

12. A system according to claim 11, wherein said fourth means includes fifth means to detect said first and second ratios to control the separation of said code groups and said code characters from said integrated pulse train.

13. A system according to claim 12, wherein said fourth means further includes a sixth means coupled to said fifth means responsive to the output therefrom to pass said code groups to its output when said first ratio is detected, to pass said code characters to its output when said second ratio is detected, and to prevent the passage of said code groups and said code characters when neither of said first and second ratios are detected.

14. A system according to claim 13, wherein said fourth means further includes a seventh means coupled to said sixth means to provide the code group representing zero amplitude for the code group output when said second ratio is detected and when neither of said first and second ratios are detected.

15. A communication system comprising:

a single source of time division multiplex train of code groups each representing the amplitude of a different one of a plurality of sources of a first type of intelligence;

a source of code characters representing a second type of intelligence;

a first means coupled to said source of said multiplex train responsive to all said code groups of said multiplex train to detect at least one code group of said multiplex train representing a given amplitude of the intelligence of said plurality of sources;

a second means coupled to said source of code characters, said source of said multiplex train, and said first means to substitute said code characters for said one code group when detected;

third means coupled to said second means for transmission of the resultant integrated pulse train; and fourth means coupled to said third means responsive to the bits of both said code groups characters for separation thereof from said integrated pulse train;

said fourth means including a means coupled to said third means responsive to the bits of both said code groups and said code characters of said integrated pulse train to detect errors in said integrated pulse train and stop said separation when said errors are detected.

16. In a communication system, a receiver comprising:

means to store an integrated pulse train including code groups representing the amplitude of at least one source of a first type of intelligence, each of said code groups having a first constant ratio of "marks" to "spaces," and code characters representing a second type of intelligence, each of said code characters having a second constant ratio of "marks" to "spaces" different than said first ratio; and means coupled to said means to store responsive to said first and second ratios to control the separation of said code groups and said code characters from said integrated pulse train.

17. A receiver according to claim 16, further including means coupled to said means to store responsive to an error in either of said first and second ratios to stop said separation when said error is detected.

18. In a communication system, a receiver comprising:

means to store an integrated pulse train including code groups representing the amplitude of a plurality of sources of a first type of intelligence, each of said code groups having a first constant ratio of "marks" to "spaces," and code characters representing a second type of intelligence, each of said code characters having a second constant ratio of "marks" to "spaces" different than said first ratio; and means coupled to said means to store responsive to said first and second ratios to control the separation of said code groups and said code characters from said integrated pulse train.

19. A receiver according to claim 18, further including means coupled to said means to store responsive to an error in either of said first and second ratios to stop said separation when said error is detected.

References Cited by the Examiner

UNITED STATES PATENTS

| | | | |
|---|---|---|---|
| 2,207,711 | 7/1940 | Berger et al. | 179—15 |
| 3,200,201 | 8/1965 | Runyon | 179—15 |
| 3,226,482 | 12/1965 | Wright | 179—15 |

DAVID G. REDINBAUGH, *Primary Examiner.*

ROBERT L. GRIFFIN, *Examiner.*